US012675821B1

(12) United States Patent
Rogerson

(10) Patent No.: US 12,675,821 B1
(45) Date of Patent: Jul. 7, 2026

(54) MINIMIZATION OF THE CONSUMPTION OF DATA PROCESSING RESOURCES IN AN ELECTRONIC TRANSACTION PROCESSING SYSTEM VIA UTILIZATION OF PHYSICAL DELIVERY

(71) Applicant: Chicago Mercantile Exchange Inc., Chicago, IL (US)

(72) Inventor: Mark Andrew Rogerson, London (GB)

(73) Assignee: Chicago Mercantile Exchange Inc., Chicago, IL (US)

( * ) Notice: Subject to any disclaimer, the term of this patent is extended or adjusted under 35 U.S.C. 154(b) by 42 days.

(21) Appl. No.: 18/231,393

(22) Filed: Aug. 8, 2023

(51) Int. Cl.
*G06Q 40/04* (2012.01)
(52) U.S. Cl.
CPC .................................... *G06Q 40/04* (2013.01)
(58) Field of Classification Search
None
See application file for complete search history.

(56) References Cited

U.S. PATENT DOCUMENTS

| | | | | |
|---|---|---|---|---|
| 5,444,820 A | * | 8/1995 | Tzes | G06N 3/043 |
| | | | | 706/900 |
| 6,061,437 A | * | 5/2000 | Yoon | H04M 15/00 |
| | | | | 379/115.01 |
| 6,526,417 B1 | * | 2/2003 | Perry | G06F 16/2358 |
| 7,831,491 B2 | | 11/2010 | Newell | |
| 7,853,499 B2 | | 12/2010 | Czupek | |

| | | | | |
|---|---|---|---|---|
| 7,996,296 B2 | * | 8/2011 | Lange | G06Q 40/02 |
| | | | | 705/37 |
| 8,285,621 B1 | * | 10/2012 | Bak | G06Q 40/04 |
| | | | | 705/36 R |
| 11,270,380 B1 | * | 3/2022 | Katschinski | G06Q 40/04 |
| 2002/0194115 A1 | * | 12/2002 | Nordlicht | G06Q 40/04 |
| | | | | 705/37 |
| 2005/0096999 A1 | | 5/2005 | Newell | |
| 2005/0097025 A1 | * | 5/2005 | Horton | G06Q 40/04 |
| | | | | 705/37 |
| 2005/0137956 A1 | * | 6/2005 | Flory | G06Q 99/00 |
| | | | | 705/37 |
| 2005/0137964 A1 | * | 6/2005 | Nordlicht | G06Q 40/06 |
| | | | | 705/37 |
| 2006/0036531 A1 | * | 2/2006 | Jackson | G06Q 20/042 |
| | | | | 705/37 |
| 2006/0253355 A1 | * | 11/2006 | Shalen | G06Q 40/06 |
| | | | | 705/35 |
| 2007/0136180 A1 | * | 6/2007 | Salomon | G06Q 40/06 |
| | | | | 705/37 |
| 2007/0143199 A1 | * | 6/2007 | Stiff | G06Q 40/06 |
| | | | | 705/36 R |

(Continued)

OTHER PUBLICATIONS

CME Group, "About BTIC and BTIC+ trading", Jan. 21, 2021, 9 pages.

(Continued)

*Primary Examiner* — William J Jacob
(74) *Attorney, Agent, or Firm* — Lempia Summerfield Katz LLC

(57) ABSTRACT

The disclosed embodiments relate to a system for automatically using a physical delivery of a dynamically generated position in an outright futures contract to satisfy a delivery requirement of a spread futures contract to, upon expiration thereof, deliver at least one component whose value is unknown at a time of delivery.

23 Claims, 6 Drawing Sheets

(56) References Cited

U.S. PATENT DOCUMENTS

| | | | | |
|---|---|---|---|---|
| 2007/0239589 A1* | 10/2007 | Wilson | G06Q 40/04 | 705/37 |
| 2008/0270284 A1* | 10/2008 | Cummings | G06Q 40/00 | 705/37 |
| 2009/0043686 A1* | 2/2009 | Matsumoto | G06Q 30/06 | 705/37 |
| 2009/0182658 A1* | 7/2009 | Lutnick | G06Q 40/00 | 705/37 |
| 2009/0254471 A1* | 10/2009 | Seidel | G06Q 40/06 | 705/37 |
| 2010/0138362 A1* | 6/2010 | Whitehurst | G06Q 40/04 | 705/37 |
| 2011/0320332 A1* | 12/2011 | Kanitra | G06Q 40/04 | 705/37 |
| 2014/0006243 A1 | 1/2014 | Boudreault | | |
| 2014/0019324 A1* | 1/2014 | Nyhoff | G06Q 40/04 | 705/37 |
| 2014/0229351 A1* | 8/2014 | Lutnick | G06Q 40/04 | 705/37 |
| 2015/0039578 A1* | 2/2015 | Campbell | G06F 16/217 | 707/703 |
| 2015/0106250 A1* | 4/2015 | Deel-Smith | G06Q 40/04 | 705/37 |
| 2015/0112844 A1* | 4/2015 | Labuszewski | G06Q 40/04 | 705/37 |
| 2015/0112846 A1* | 4/2015 | Labuszewski | G06Q 40/04 | 705/37 |
| 2015/0170272 A1* | 6/2015 | Gogol | G06Q 40/04 | 705/37 |
| 2015/0310547 A1* | 10/2015 | Ehinger | G06Q 40/04 | 705/37 |
| 2016/0035028 A1* | 2/2016 | Hedges | G06Q 40/06 | 705/37 |
| 2018/0096427 A1* | 4/2018 | Pierce | H04L 51/04 | |
| 2020/0184558 A1* | 6/2020 | Crumb | A61K 49/0032 | |
| 2023/0214924 A1* | 7/2023 | Lutnick | G06Q 40/06 | 705/37 |

OTHER PUBLICATIONS

CME Group, "Euro Short-Term Rate (€STR) Three-Month Single Contract Basis Spread Futures", 2023, 2 pages.

CME Group, "European Overnight Index futures", Short-Term Interest Rate futures on €STR and RepoFunds Rates (RFR), 2023, 2 pages.

CME Group, "€STR Three-Month Single Contract Basis Spread futures:Settlement and Assignment", Sep. 22, 2022, 2 pages.

* cited by examiner

Single CLOB
matching engine/server
910

912

914

916

918

900

MINIMIZATION OF THE CONSUMPTION OF DATA PROCESSING RESOURCES IN AN ELECTRONIC TRANSACTION PROCESSING SYSTEM VIA UTILIZATION OF PHYSICAL DELIVERY

BACKGROUND

Electronic transaction processing systems may be used to implement electronic trading systems which facilitate electronic trading of financial instruments. Financial instruments, e.g., forward and options contracts, such as futures contracts and forward agreements, may be traded via different electronic trading systems. These systems may enable different modalities by which financial instruments may be electronically traded and may be characterized as either being bilateral or centrally cleared.

As used herein, an order, order to trade or trade order, whether placed in a bilateral or centrally cleared market, refers to a willingness/desire of a trader to enter into a trade/transaction, and more particularly, to an electronic request or data message transmitted to, or received by, an electronic trading system which includes data indicative thereof, such as identity of a product, desired quantity, desired price, side (buy/sell), etc. As used herein, the term trade, executed trade, completed trade, etc., may refer to an agreement between two parties, each to fulfill an obligation defined by the transaction, and may further refer to a given order and the one or more suitable counter orders with which the given order has been matched and/or further cleared and/or settled. Orders may typically be canceled or modified by the submitting trader prior to them being matched with a suitable counter order or otherwise accepted by a counter party. Once executed, the trader typically must fulfill their obligation unless they transfer, e.g., sell, or offset, such as by entering into an opposing trade, that obligation to another trader prior to the date on which fulfillment of their obligation is required.

In bilateral trading systems, often referred to as over the counter (OTC) or private markets, trades are bilateral, e.g., negotiated directly between the parties, and may involve standard or non-standard contract terms, depending upon the needs of the parties. As each party bears the risk that the other party will not perform their side of the agreement, part of the bilateral trading process typically involves establishing counter-party credit, or otherwise establishing credit relationships with potential counterparties for use in future transactions, to mitigate the risk of loss due to a counter party's failure to perform. With a credit relationship established, the parties exchange/negotiate the terms of the transaction until mutually agreed upon terms are or are not reached. Once the parties agree to the terms of a transaction, the transaction may be submitted to a centralized clearing and settlement system, such as the Continuous Linked Settlement (CLS®) system, Marketwire™ or LCH™, which may handle the process of completing the transaction between the parties. If the parties do not agree, they may simply walk away.

Many contracts traded via a bilateral trading system are related to interest rates. An interest rate is the price of money. A backward interest rate is price of money for a time period prior to the time that the rate is set, e.g. for the prior day, also referred to as an overnight rate. A forward interest rate is the price, determined at the time the rate is set, of money for a future time period, e.g. the rate represents today's cost of future money. Interest rate benchmarks— also known as reference rates or just benchmark rates—are regularly updated interest rates that are publicly accessible. They are a useful basis for all kinds of financial contracts such as mortgages, bank overdrafts, and other more complex financial transactions. Benchmark rates are calculated by an independent body, most often to reflect the cost of borrowing money in different markets. For example, they might reflect how much it costs for banks to borrow from each other. Alternatively they might reflect how much it costs banks to obtain funds from other sources, such as pension funds, insurance companies and money market funds. This means that these benchmark rates play a key role in the financial system, the banking system and the economy overall. Short term interest rates are interest rates typically used for debt with future maturities less than one year from the current date and are typically administered by the central banks of nations, where the different rates set by different national institutions may be used for different purposes. As opposed to short term interest rates, long term interest rates, for use with debt having maturities greater than 1 year, are typically set by market forces, i.e. through the bilateral negotiations of self-interested parties looking to transact based on the interest rate. Examples of national, institutionally set short-term interest rates are the Federal Funds ("Fed Funds") rate Euro Short Term Interest Rate ("ESTR"), the overnight borrowing costs of banks in the euro-zone.

The Fed funds rate is the rate at which U.S. banks lend money to each other overnight. The money in question is the reserves that sit in their bank accounts in the Federal Reserve system. If Bank A has excess reserves at the end of the day and Bank B has a reserve deficit at the end of the day (reserves are the money they have to keep on hand-electronically, at least—in case people ask for it; reserve requirements are set by the Federal Reserve), Bank A will loan the money to Bank B for a period of one day. The rate of interest Bank A will charge is the Fed funds rate. The Fed funds rate and ESTR are backwards looking rates in that they are each an aggregation of data from the prior day. That is, as opposed to being predetermined at the start of a time period, the Fed funds rate or ESTR is computed based on previously occurring events. Interest rate futures contracts, which are based on the Fed funds rate or ESTR, are typically defined to settle at the end of a month based on the average effective Fed funds rate occurring each day over that month of settlement or, as in the case of ESTR, one day prior to the International Monetary Market (IMM) date, i.e., the four quarterly dates of each year which EuroDollar and Foreign Exchange futures contracts and option contracts use as their scheduled maturity date or termination date. The dates are the third Wednesday of March, June, September and December (i.e., between the 15th and 21st, whichever such day is a Wednesday). Accordingly, while one may not know the settlement price until the settlement date, as the settlement date draws nearer, the settlement price becomes more and more certain.

A forward rate agreement (FRA) is an example of a contract which is traded via a bilateral trading system and is an over-the-counter (OTC) contract between parties that determines the rate of interest to be paid on an agreed-upon date in the future. FRA's may be centrally cleared. In other words, an FRA is an agreement to exchange an interest rate commitment on a notional amount. An FRA determines the rates to be used along with the termination date and notional value and are cash-settled with the payment being based on the net difference between the interest rate of the contract and the floating rate in the market—the reference rate. The notional amount is not exchanged. It is a cash amount based on the rate differentials and the notional value of the contract. Generally, FRA's are based on forward looking benchmark interest rates such as the 3 month Euribor which is a benchmark rate for euro-denominated financial products with which banks lend or borrow excess reserves from one another over short future periods of time, e.g., from one week to 12 months.

Another example of a contract which is traded via a bilateral trading system is an Overnight Index Swap (OIS) which an interest rate swap involving the overnight rate being exchanged for a fixed interest rate. OIS's may be centrally cleared. An OIS uses an overnight rate index such as the federal funds rate or Euro Short Term Interest Rate (ESTR) as the underlying rate for the floating leg, while the fixed leg would be set at a rate agreed on by both parties. The interest of the overnight rate portion of the swap is compounded and paid at reset dates, with the fixed leg being accounted for in the swap's value to each party. The floating leg's present value (PV) is determined by compounding of the overnight rate over a given period. Generally, OIS's are based on backwards looking interest rates, i.e., realized-in-arrears benchmarks.

FRA's are contracts where two parties exchange at a fixed interest rate swap for a certain period of time. The settlement amount at the end of the FRA would be based on the difference between the interest rate set by the contract and the floating rate in the market, or the reference rate, i.e., Euribor. Whereas OIS's are contracts where overnight interest rates swap for fixed interest rate, referring to US federal funds rates or ESTR. FRA's reflect the interest rates demanded by banks, while OIS's reflect overnight risk-free interest rates. The spread between FRA and OIS represents the trends of borrowing costs. The spread usually surges when the market demands higher risk premium in light of increased uncertainty or liquidity problems. Accordingly, many traders enter into FRA-OIS spreads, by entering into the two separate positions, to essentially trade in a spread between risks, i.e., to hedge risk. At the time of settlement of an FRA, the risk becomes known based on the then-current value of the benchmark reference rate. However, at the beginning of the reference period of an OIS, the risk remains unknown until the end of the reference period, over which the interest is accrued/compounded, and the final settlement price is known.

In bilateral trading, each party, or intermediary agent, e.g., a prime broker or other access agent, via which that party trades, is, generally, directly responsible for the risk of loss in any given trade if their counterparty, or intermediary agent, e.g., a prime broker or other access agent, via which that counterparty trades, fails to perform. For example, in a cash/OTC market, prime brokers may create a central-counter party-like consolidation of counterparty risk to form a multi-tier structure where large participants, such as other prime brokers or very large banks, have bilateral risk. Bilateral electronic trading systems, such as the CME (Chicago Mercantile Exchange Inc.) Electronic Broking Services (EBS) Market system described herein, may support a three-tier structure where large, credit worthy entities, i.e., prime brokers, interact bilaterally and large to medium size trading entities access the market through those entities. Prime customers can also establish themselves as access agents, referred to as prime-of-prime brokers, servicing small and non-financial entities referred to as prime-of-prime customers. This model could be extended to any number of levels, but in practice three levels (bilateral, prime, and prime-of-prime) meet most business needs. As such, bilateral trading parties typically require credit verification or other guarantees, or risk mitigations, such as collateral, from their counterparties and often set limits on the amount of risk/exposure they are willing to undertake with a given counterparty. Such limits, which may be referred to as "hard limits," preempt transactions to prevent a limit overrun and may be applied whether or not an order trade is accepted and/or whether or not it is executed, and/or to filter or mediate the distribution of data related thereto. In contrast, a soft limit may be applied after trade execution and therefore, more loosely enforced. Accordingly, bilateral electronic trading systems typically provide risk mitigations systems in the form of credit limit mechanisms, referred to as credit controls, which allow parties, for example, to define credit limits with respect to their potential counterparties which restrict the extent/magnitude of risk exposure and have the electronic trading system monitor, manage and enforce those limits on their behalf, as well as assist the parties in understanding and managing any credit limits to which they are subject. As any given party may enter into transactions with a myriad of counterparties, the number of different credit limits which a bilateral electronic trading system may have to maintain, manage, and enforce may be substantial, as is the volume of transactions against which such limits must be assessed and accounted for.

The EBS Direct Platform, offered by CME Group, Inc., is an example of a bilateral trading system which implements bilateral credit limits and features disclosed price requests and responses. The EBS Direct Platform may be referred to as a Quote Drive Market (QDM), also referred to as a price driven market, which limits trading to binding quotes provided by designated participants, e.g., market makers or dealers, etc., also referred to as a liquidity provider ("LP"). In a QDM, orders placed in the QDM's electronic quote matching systems against a submitted quote are essentially guaranteed to be fulfilled but quotes available at different prices may be limited.

In contrast to bilateral trading systems, central counter party-based trading utilizes an intermediary entity/system to separate the transacting parties such that, within the system, they are prevented from transacting/negotiating directly with one another, or, in most cases, even knowing the identify of their counterparty. Traders submit orders to trade to the central-counterparty which matches the incoming order with one or more suitable previously received but not yet satisfied or canceled counter-orders or otherwise stores the incoming order to await receipt of a suitable counter-order. The central-counterparty then publishes market data to communicate anonymized data indicative thereof. For example, a central counterparty based electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity or other underlier, such as a currency, at a specified price at a predetermined future time. An option contract is the right, but not the obligation, to sell or buy the underlying instrument (in this case, a futures contract) at a specified price, referred to as the strike price, on or before a certain expiration date. An option contract on a futures contract, e.g., having a futures contract as an underlier, offers an opportunity to take advantage of futures price moves without actually having a futures position and is considered "in the money" when the strike price is favorable to the market price of the underlier. The commodity, instrument, or asset to be delivered in fulfillment of the contract, or alternatively the commodity, instrument, or asset for which the cash market price shall determine the final settlement price of the futures contract, is known as the contract's underlying reference or "underlier." The underlying or underlier for an options contract on a futures contract is the corresponding futures contract that is purchased or sold upon the exercise of the option. Options contracts traded via a central counterparty-based trading system may be referred to as Exchange Traded Derivative (ETD) options or ETD options contracts.

Typically, as opposed to typical bilateral contracts, e.g., forward contracts, the terms and conditions of each futures contract are standardized as to the specification of the contract's underlying reference commodity, the composition of the commodity, quantity, delivery date, and means of contract settlement. Such standardization may improve the liquidity of these contracts, e.g., the ease with which such contracts may be bought or sold. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives. At expiry, an option on futures, if in the money (ITM), provides a cash settled payment plus the underlying futures contract, and if out of the money (OTM), it provides nothing. An underlier of a futures contract may be a currency, e.g., the contract may be for delivery on a specified date of a quantity of euros in exchange for a defined payment in U.S. dollars.

A central counterparty-based exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting, and maintaining performance bond funds, regulating delivery, and reporting trading data. One of the roles of the clearing house is to mitigate counterparty credit risk on behalf of the transacting parties as well as the exchange. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system, which operates under a central counterparty model, acts, e.g., using the clearing mechanism described above, as an intermediary between market participants for the transaction of financial instruments and assumes the counterparty risk to each. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

Accordingly, in central counterparty based systems, generally, there may be no need for one party to be concerned about the credit worthiness of another party and such credit verifications or counterparty credit limits may be avoided. However, the electronic trading system or central counterparty, itself, may impose credit verifications and limits and other risk mitigations. For example, a central counterparty based system may require traders to post a performance bond, or margin, in an amount set to cover the potential risk of loss of a trader's current positions. This performance bond may be adjusted on a periodic, e.g., daily, basis to account for the trading activities of the trader and the then current market value of their positions. In addition, where market participants transact in the trading system on behalf of other parties who may be financially responsible for the activities of those traders, the electronic trading system may permit the responsible party to specify limits on the number or magnitude of open orders or completed trades, such as a margin limit.

The CME futures exchange may be one example of what is referred to as an Order Driven Market (ODM) in which traders submit, with some limitations, arbitrary orders to buy or sell which are matched with previously received suitable counterorders, stored in an order book database, also referred to as a Central Limit Order Book (CLOB), or, otherwise, advertised to the market participants in order to attempt solicit a suitable counter order. Whereas an ODM may be more transparent than a QDM, providing visibility, e.g., via an order book database, to all individual market orders to trade, a QDM provides liquidity by guaranteeing quoted prices. That is, in an ODM, a trader may place an order to buy or sell at a desired price but there is no guarantee that another trader will place a suitable counter order thereto to be matched by the ODM's electronic matching engines and traded. Other types of markets, including hybrid ODM-QDM markets, may also exist.

For example, the EBS swap execution facility (SEF) is an example of an electronic trading system for FRA's or OIS's which does not act as a central counterparty and is considered an ODM. The EBS Market electronic trading system relies on bilateral credit limits for matching and settlement and is considered an anonymous, firm central limit order book which may serve as a "public" reference market for cash FX transactions/instruments. In this system, in contrast to a futures exchange which maintains anonymity, the bilateral relationship between trading counterparties is only known after a trade is completed for settlement purposes.

More particularly, a QDM may, but not always, be considered a relationship-based model where there is limited anonymity—participants know their counterparty prior to transacting. Generally, in a QDM, participants play one or both of two discrete roles, liquidity providers (LP) and liquidity consumers (LC). These roles are fundamental but can be blurred by some platform features. In an ODM, the participants are more equal where in the general case any participant can be a provider or a consumer. In a QDM, a LP prices their market data based on a prior evaluation and classification of consumers. In ODM, makers submit their orders that are priced without knowledge, at least prior to settlement, of the potential counterparty to a trade. ODM's may or may not act as a central counterparty. Another difference is that in a QDM, LP's submit market data and consumers submit orders against that market data (the QDM platform often will aggregate and filter provider market data). Another way to consider these types of platforms is to consider business usage. For very liquid instruments that have efficient pricing (tight spread with reactive/volatile pricing), a central limit order book (CLOB) or ODM platform may provide the safest venue for exchanging risk due to efficient price discovery and collective wisdom of the market to set the price. When an instrument's price is very stable (not volatile) and/or market liquidity is thin (manifesting a wide bid/offer spread in a CLOB for example), a QDM platform may be preferred because the foreknowledge of one's counterparty allows quoting a tighter spread with greater safety and the consumer being able to know their provider allows certainty of fairness. When an instrument is very illiquid and/or specialized to the point that a provider can't safely provide a continuous price to a collection of similar consumers, then the bespoke pricing method becomes helpful—these are referred to as request for quote (RFQ) or request for stream (RFS). Consumers ask for a price in an instrument and providers with knowledge of the consumer and current market conditions can elect to provide a price or stream of prices to the consumer.

Current financial instrument trading systems allow traders to submit orders and receive confirmations, market data, and other information electronically via an electronic communications network at one or more execution venues, e.g., which implement/provide ODM and/or QDM type markets. These execution venues may be geographically dispersed for the convenience of the traders or operator thereof and/or so as to be located geographically, i.e., in particular geographic regions, and/or logically, close to traders in order to, for example, minimize latency therebetween. An execution venue may refer to a physical and/or logical location at which electronic data messages comprising orders to trade are considered to have been received by an electronic trading system and accorded priority against other such electronic data messages subsequently received thereby which are competing for the same trading opportunity, i.e., where the trading system applies determinism to the received order, or where the orders to trade or received electronic data messages are actually matched with a suitable counterparty forming a binding trade.

An execution venue may further refer to a geographic and/or logical location from which market data messages indicative of market activities/events are transmitted, i.e., released on to a network for transmission to recipients and no longer under the control of the electronic trading system, to at least a subset of market participants.

An execution venue may comprise the electronic networking and transaction processing components necessary to couple the electronic trading system with a network external thereto, e.g., the Internet, process received electronic transactions and transmit market data messages, or may comprise only the electronic networking components necessary to couple the electronic trading system with the network, ascribe priority to received data messages and relay, such as via a public and/or private electronic communications network, those received prioritized transactions to transaction processing components located remotely therefrom. An execution venue may be a geographic and/or logical location where a limit on credit/risk is enforced and/or consumed.

For additional details and descriptions of execution venues, e.g., which implement/provide ODM and/or QDM type markets, and credit limits, see U.S. application Ser. No. 17/733,565, filed on Apr. 29, 2022, entitled "LOW LATENCY REGULATION OF DISTRIBUTED TRANSACTION PROCESSING IN ACCORDANCE WITH CENTRALIZED DEMAND-BASED DYNAMICALLY REALLOCATED LIMITS", assigned to the assignee of the present application, the entirety of which is incorporated by reference herein and relied upon.

Aside from the above differences, bilateral and central-counterparty based trading systems differ in terms of who bears responsibility for counterparty risk, i.e., the risk of financial loss to one party to a trade due to the actions, inactions, or consequences thereof, such as the failure to perform on their obligations specified in the transaction, of the counterparty thereto.

Further, bilateral and central-counterparty based trading systems differ in terms of technical architecture. As shown in FIG. 5, in a central counter-party electronic trading system 900, from a logical and/or physical standpoint only one single matching engine/server, processor and/or processing thread 910 may be implemented reflecting the centralized nature of the system to interact with market participant computer systems 912, 914, 916, and 918. It will be appreciated that a central counter-party electronic trading system 900 may, in fact, be implemented by a multitude of servers, processors, and/or processing threads. In contrast, FIG. 6 shows an example of a QDM system (bilateral system) 1000 with market participant computer systems 1010, 1012, 1014, and 1016. As shown in FIG. 6, market participant computer systems negotiate directly with one another via a communications "session", by sending their requests or responses to exchange servers/processes/threads 1002 and 1004 which then relay them to the correct market participant computer system recipient(s). As there may be multiple independent/concurrent sessions, architecturally (logically and/or physically), the bilateral electronic trading system may be comprised of multiple servers, processors and/or processing threads, e.g., exchange servers 1002 and 1004, and one or more central clearing/settlement systems 1006 and 1008 (or the clearing and/or settlement system(s) may be external thereto), or multiple independent processes, each of which is facilitating the largely interactions between different requestors/responders, i.e., different private markets/sessions operating on the system. As shown in FIG. 6, in a bilateral system/QDM system 1000 the architecture is scaled horizontally, and many exchange servers and systems may be used. This QDM horizontal scaling exists both because a central venue where all quotes come together is not needed, but also because it is required to process the number of quotes which are much higher than a CLOB because there are multiple versions used while the trade negotiation is taking place.

While a central counter party-based trading system may offer certain advantages, such as anonymity and risk management, bilateral trading may still often be utilized in situations where the parties prefer not to use a central counterparty, e.g. due to cost, efficiency or other concerns, where the parties wish to complete a transaction as quickly as possible, and/or for non-standard transactions or unique transactions where the transaction terms are not standardized and/or the number of potential suitable and/or interested counter parties may be limited.

However, for example, in the context of FRA-OIS spreads, a trader wishing to enter into such an arrangement typically enter into two separate transactions, increasing the consumption of the computational resources of the electronic trading system. In addition, the lack of anonymity in bilateral trading systems may present information advantage for one trading party over another as the process of entering into OTC FRA and OIS agreements necessarily requires one party to reveal information regarding intent or sentiment to the other.

Accordingly, it may be desirable to offer a mechanism by which a trader can enter into an interest rate hedging transaction which minimizes the consumption of the computational resources of the electronic trading system and simplifies administration while providing anonymity and allowing for each transacting party to manage their positions independent of their counter party.

BRIEF DESCRIPTION OF THE DRAWINGS

Figure 5:
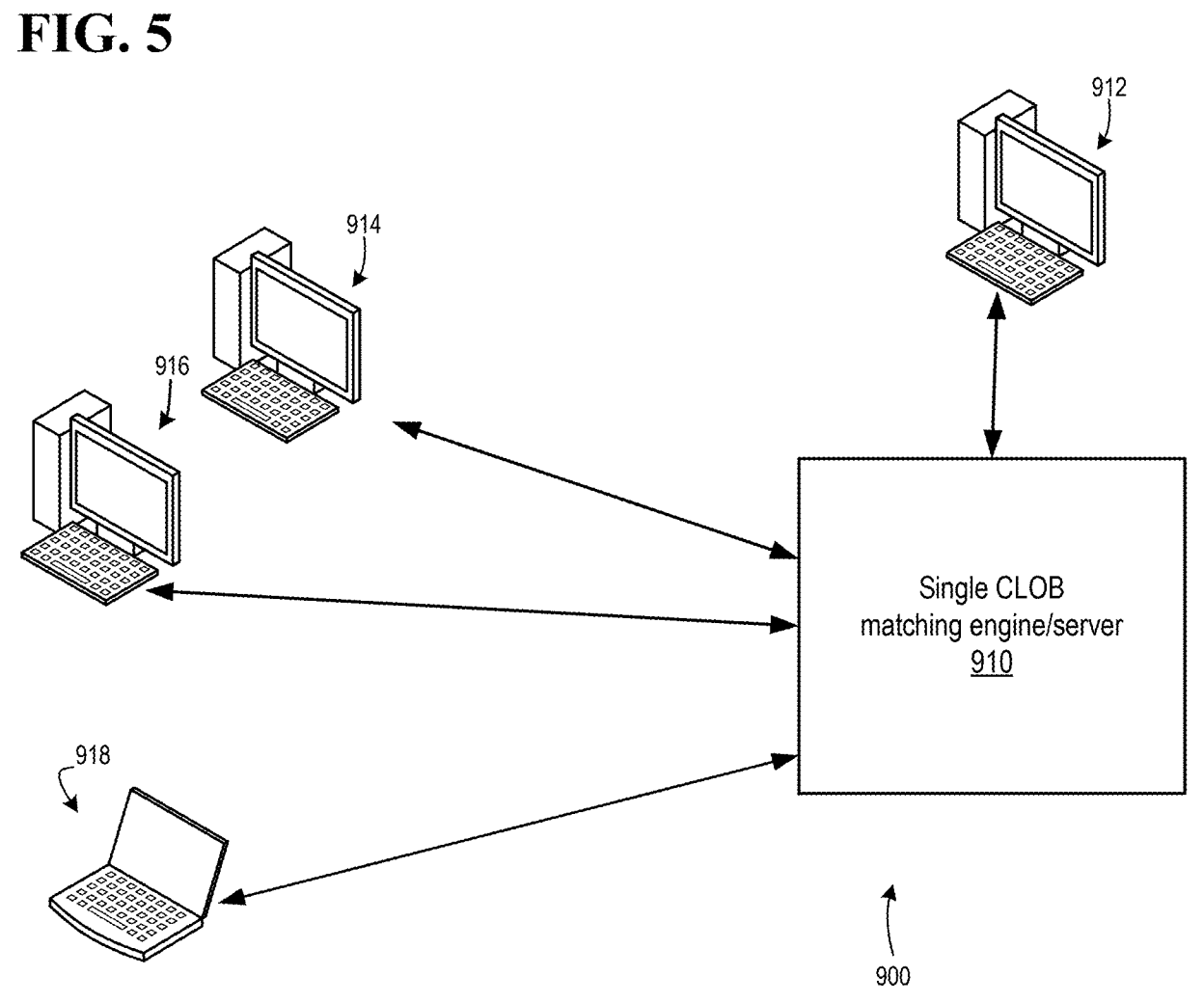

FIG. 5 depicts a block diagram of a CLOB according to some embodiments.

DETAILED DESCRIPTION

Figure 1:
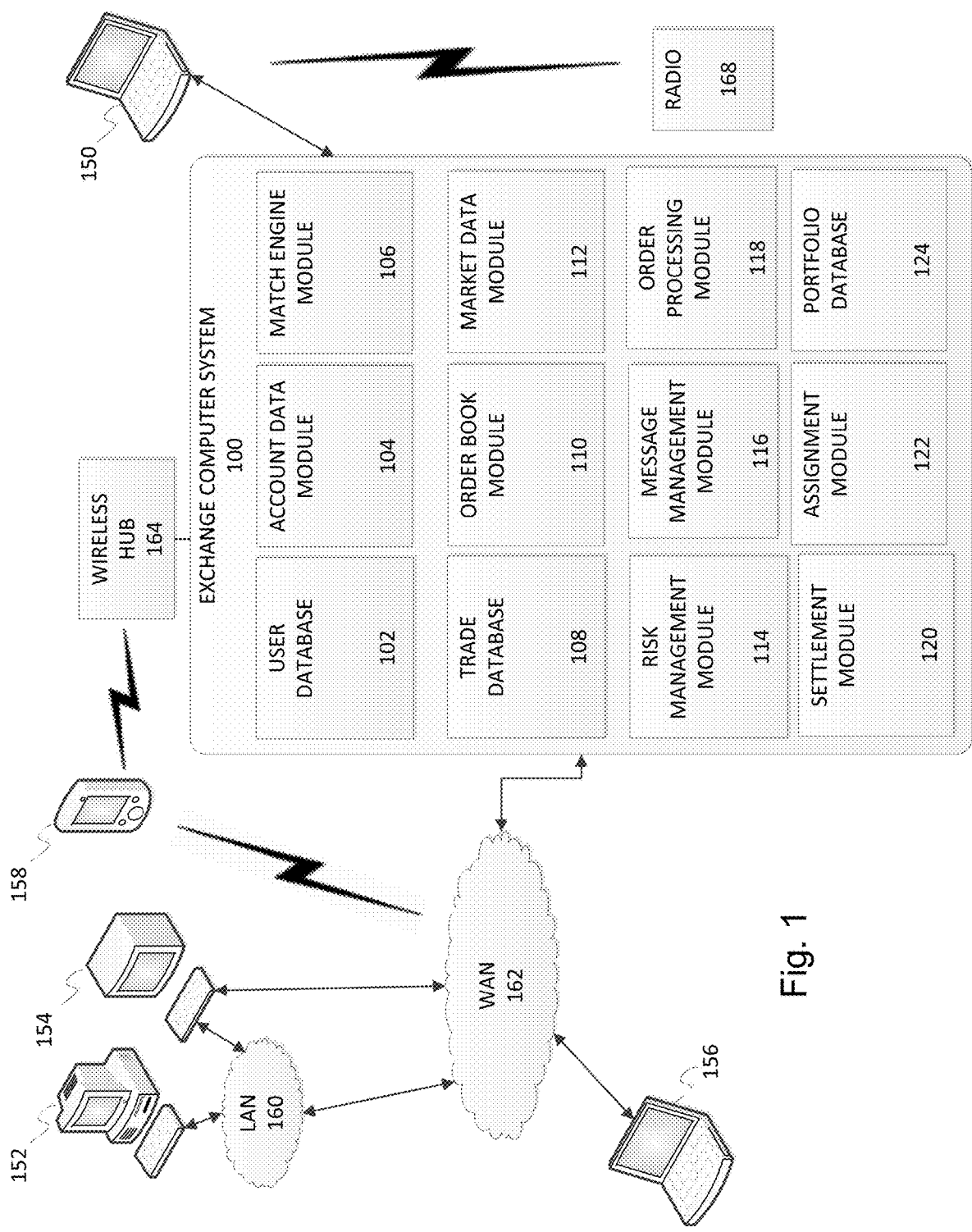
FIG. 1 depicts a computer network system, according to some embodiments.

The disclosed embodiments relate to a system for automatically using a physical delivery of a dynamically generated position in an outright futures contract to satisfy a delivery requirement of a spread futures contract to, upon expiration thereof, deliver at least one component whose value is unknown at a time of delivery. More particularly, the disclosed embodiments, enable hedging of interest rate risk using single transaction to implement a spread and transact in the differential between a value determined at settlement and a value of a subsequently settled transaction, reducing the number of necessary transactions, where upon settlement of the spread transaction, the delivery requirement thereof to each counter-party is satisfied via provision of a dynamically generated and specifically tailored position in another transaction which settles at a later time, thereby replicating the hedging position while avoiding any impediments to delivery.

Generally, an interest rate spread transaction between a forward looking interest rate benchmark and a backward looking interest rate benchmark is replicated using a single futures transaction which settles at a value based on the forward looking interest rate benchmark which is then used to deliver a position in another futures contract which settles based on the backwards looking interest rate benchmark. By replicating the spread using two distinct settlement periods of two futures contracts, a dynamically generated futures position for both parties is used to satisfy the physical delivery requirement of the spread futures contract enabling the disclosed embodiments further bifurcate the subsequent delivery obligations. This enables either party to continue, unpenalized, with their respective obligation if they so choose irrespective of the other parties' actions. Further, this bifurcation enables the resultant positions to be utilized for offsetting or netting, so as to readily exit a position or utilize that position to reduce monetary requirements such as for margin or other regulatory requirements, as well as reduce the data/database storage requirements and/or computational resource requirements associated with storing and/or processing the data indicative of those positions.

In particular, a clearing house computer system, upon determining that a bilateral forward contract for delivery of a particular currency has, or is about to expire, may compute a financially equivalent position in one or more futures contracts for delivery of the same currency and assign those positions to the parties to the bilateral contract in lieu of the physical delivery obligation therein. The futures contract position is computed so as to replicate, e.g. provide substantially the same, financial characteristics, e.g. profit and loss, as the bilateral contract at the expiration thereof.

As was noted above, in order to trade basis risk between a forward looking interest rate benchmark, such as Euirbor, and a backwards looking interest rate benchmark, such as ESTR, one may enter into two bilateral/OTC agreements, a suitable FRA and a suitable OIS, the net result of these two transaction being the desired spread. However, as was noted above, this requires two independent transactions, increasing the necessary computational resources to create, communicate, store and manage the transactions. Further, due to the nature of over-the-counter/bilateral transactions and the need for a credit relationship between the counter-parties to manage performance risk, at least some information regarding the transactions must be communicated between the counter-parties, which may provide an information advantage to one over the other, e.g., at least conveying one party's intent or strategic expectations to the other.

Generally, in the OTC/bilateral market for example, one can trade Forward Rate Agreement (FRA)-Overnight Index Swap (OIS) to trade basis risk between Euribor and ESTR. The FRA will settle to the Euribor benchmark rate similar to single period swap agreement but is settled upfront/at beginning of interest rate reference period (vs swap which settles at the end) and discounted at the FRA settlement rate. For a 3 month single period swap, the floating rate is fixed today/at entry into the position and the fixed rate is the rate at which the contract was traded and at end of the period the parties exchange the difference in the fixed vs floating cash flows. In a FRA, settlement is computed based on a net present value (NPV) of the end-of-period cash flow differentials using a fixing rate. In a FRA, it is forward looking so one knows the settlement value at the beginning of reference period.

In contrast, an OIS agreement settles to a realized compounded rate of, for example, ESTR. In this case, the contract accrues interest on day by day basis which is compounded to give a settlement price that is not available until end of the reference period. That is, an OIS is backward looking-one knows the value at the end of the reference period.

Accordingly, while both the FRA and OIS provide for a settlement that is in the future and, prior to settlement, the risks undertaken by these agreements is unknown, at the time of settlement, the FRA risk becomes known but the OIS risk remains unknown but starts to accrue or otherwise become more defined over time, e.g., as the end of the reference period approaches. It will be appreciated then that the spread risk at the expiry/settlement of the FRA becomes outright risk in the OIS.

In on embodiment, using a central counterparty based electronic trading system, a futures contract is provided which replicates the operation of a bilteral FRA-OIS spread arrangement. This futures contract may be referred to as a Single Contract Basis Spread Future (SCBSF) or ESTR Single Contract Basis Spread Future (ESCBSF). For example, one may buy an SCBSF to gain exposure to spread widening (difference in risk increasing), or sell to gain exposure to spread narrowing. Orders to buy or sell an SCBSF may be listed in and order book database/data structure where they are listed by value of their spread/differential. Prior to expiration, long/short positions in an SCBSF may settle each day, e.g., for daily margin computation (mark to market) based on the current contract price less the current forward delivery price.

In one implementation, the SCBSF is offered as a 3 month contract expiring (final settlement) at the beginning of an interest accrual period. One leg/component of the SCBSF settles in accordance with the Euribor interest rate benchmark at the beginning the interest rate accrual period while a second leg/component of the SCBSF settles in accordance with the ESTR at the end of the interest rate accrual period. The SCBSF is sized in accordance with the associated outright OIS short term interest rate (STIR) ESTR Futures Contract.

At the expiration/settlement time of the SCBSF, which is beginning of reference/interest rate accrual period, a position in an outright futures contract on the OIS leg/component is dynamically generated and assigned to exactly replicate that component. The assigned position is for an adjacent contract covering the same reference/interest rate accrual period, i.e., it settles/expires at a later time. For example, upon the expiration of a 3 month SCBSF, a 3 month ESTR futures position is created with its settlement/expiration being 3 months later.

The price of the dynamically generated futures position is computed based on the referenced 3 month forward Euribor rate and the last daily settlement price of SCBSF (use Friday price for Monday settlement) as follows:

100—Euribor rate+last settlement price=assignment price for the long and the short positions in ESTR future.

Once these new positions are created, one for each counter party to the expired SCBSF, the parties can keep or sell new ESTR futures positions.

In one implementation, CME's BTIC+functionality, described in more detail below, is used to settlement the SCBSF and deliver the positions in the separate new outright futures contract, e.g., the ESTR future.

This new/delivered outright futures contract settles based on a forward, e.g., three month, realized compounded overnight, e.g., ESTR, rate, i.e., it has the same accrual period by reference to the published benchmark rate, e.g., the 3 month Euribor benchmark, and the most recent settlement price of the SCBSF contract. Effectively the SCBSF settles into another dynamically generated futures contract (ESTR futures) position which may then be cash settled based on a reference period, e.g., 3 months.

Advantageously, this ensures physical delivery to ensure price validity without risk of scarcity of the asset or underlier thereof to be delivered, i.e., the positions are dynamically generated with no restriction on supply or external, supply/demand based, price influence.

By using the internal clearing house computer system of the exchange/electronic trading system as described, reliance on external third party clearing systems, such as Marketwire™ or LCH™, may be eliminated or reduced, reducing transaction processing delays and/or network bandwidth utilization due to having to transmit transactions to such systems. Further, costs may be reduced by eliminating or minimizing fees charged by these third-party services. Additionally, the disclosed embodiments replicate the mechanics of two separate transaction using only a single transaction which utilizes dynamically generated futures positions to meet the delivery requirement and create requisite risk spread.

While the disclosed embodiments will be described with respect to replication of FRA-OIS bilateral spreads with respect to Euribor and ESTR interest rate benchmarks, it will be appreciated that the disclosed embodiments may be applicable to other spread/risk hedging arrangements between other forward and backward looking interest rate benchmarks.

In one example embodiment, a Euro Short-Term Rate (€STR) Three-Month Single Contract Basis Spread Futures is provided and designed to provide efficient liquidity between forward-looking benchmarks, such as 3-Month Euribor, and realized-in-arrears benchmarks, such as €STR or Repo Funds Rates, CME Group is launching Three-Month Single Contract Basis Spread futures. These contracts aim to provide hedging for risks that have traditionally been managed using OTC FRA/OIS transactions by offering exposure to both the series of OIS rates and 3-Month Euribor in a single product.

Each contract is sized to be the same as their associated outright OIS STIR contracts where 1 basis point price movement is valued at €25 per contract. The tradable price of these futures is designed to represent the difference between the expected or projected value of the prevailing forward-looking rate, such as Euribor, and the projected value of the realized-in-arrears rate, such as €STR or Repo Funds Rates. The price relationship is maintained by reference to the final settlement process.

In this embodiment, final settlement of an €STR Three-Month Single Contract Basis Spread Future occurs at the beginning of its interest period. Settlement is by assignment into the adjacent outright contract covering the same interest period. For example, the September-2022 €STR Three-Month Single Contract Basis Spread futures contract (contract code EUSU2) will assign into the associated September 2022 €STR future (contract code ESRU2). This in turn will settle approximately three months later when all the required overnight benchmark rates in the reference period are known. This process is intended to be analogous the settlement of FRA/OIS transactions in the OTC world.

Final settlement of Three-Month Single Contract Basis Spread futures will occur two good business day prior the IMM Wednesday, typically on the Monday preceding an IMM Wednesday. Upon the publication of the 3-Month Euribor rate the exchange will calculate the assignment price.

Assignment price will be used to assign long (short) holders of Three-Month Single Contract Spread futures contracts into long (short) positions of same month in their associated outright contracts. Assignment will be on a 1:1 basis.

In particular, in this embodiment, the assignment price is determined as follows:

100—3-Month Euribor Benchmark Rate+3-Month Single Contract Spread Future last Daily Settlement WHERE: Last daily Settlement is in the normal end-of-day settlement price for the Three-Month Single Contract Spread futures as at the end of the day on the Friday, or prior good business day, preceding the Monday prior to IMM Wednesday.

In one embodiment, the September 2022 €STR Three month Spread futures will assign into the September 2022 €STR outright future. Recalling that the contract critical dates for outright €STR or RFR futures are defined for a given delivery months as follows: The Reference Quarter shall be the interval that ends on (and does not include) the third Wednesday of the contract delivery month, and that begins on (and includes) the third Wednesday of the third calendar month preceding the contract delivery month. And that an €STR or RFR futures delivery month is three months after the contracts named month, we can observe that for the September named month the dates in 2022 are defined as: From and including Sep. 21, 2022, to and not including Dec. 21, 2022.

Using September 2022 as an example, there will be the following contract critical dates:

Sep. 16, 2022: Friday preceding IMM date;

Sep. 19, 2022: Fixing date for 3-Month Euribor rate with value on IMM date;

Sep. 21, 2022: IMM date; and

Dec. 21, 2022: IMM date three months hence.

Adding hypothetical settlement prices as follows:

Spread contract Daily settlement price on Sep. 16, 2022: 0.2250;

3-Month Euribor fixing rate on Sep. 19, 2022:0.4511; and

Daily Settlement price of €SRU2 on Sep. 16, 2022: 99.7750.

Per this example, the assignment price of long and short positions into new Sep2022 €STR (ESRU2) contracts is: 100−0.4511+0.2250=99.7739

In this example the assignment price is very close to the previous settlement price of the outright contract with the difference being within the bid/ask spread of valid tick prices.

As another example to see what happens when that is not the case, the same settlement prices are used as specified above. However, in this example a change in future expectations for €STR rates is realized, such that the outright €SRU2 contract trades up to 99.81 in early Monday trading. However, no corresponding change in the expectations for Euribor is realized. As a result, the spread contract EUSU2 trades up to 0.2600.

Here, at assignment, the spread contract assigns into the outright contract at exactly the same price as in the first example. A long position in the spread that was valued at 0.2250 at previous settlement and is now trading at 0.2600 realizes the gain in value by assignment into the outright contract at 99.7739 relative to the market trading at 99.81.

Similarly, a short position who sees a benefit in the assignment price at 0.2250 relative to current market finds that benefit offset by the assignment into a short outright position in €SRU2 at a price lower than current market.

This settlement mechanism means that the holders of spread contracts achieve assignment at prices that are effectively the market price of the spread at the time of the three-month benchmark publication.

Once a participant is assigned into an outright €STR or RFR futures position, they may either trade out of the position to neutralize risk and crystallize profit and loss or hold the outright futures contract to the end of its reference period and subsequent cash settlement based on the calculation methodology as follows: The final settlement price for an expiring 3M €STR futures contract is 100 minus the €STR benchmark rate, compounded over the contract's Reference Quarter. The Reference Quarter for 3M €STR futures is the interval from the third Wednesday (inclusive) of the month three months prior to the delivery month, to the third Wednesday (exclusive) of the delivery month.

Where

| FINAL SETTLEMENT PRICE = 100 − R | |
| --- | --- |
| R | $[\,n_i\,\{1 + (d_i/360)*(r_i/100)] − 1]\times\{360/D)\times 100$ |
| N | Number of TARGET securities market business days in the Reference Period |
| i | Running variable indexing TARGET market business days during Reference Period |
| $n_i$ | Capital pi (Π) indicates the terms of the series should be compounded. It is the product of values indexed by the running variable, i = 1, 2, . . . , n. |
| $r_i$ | €STR value for ith TARGET market business day |
| $d_i$ | Number of calendar days to which $r_i$ applies |
| D | $\Sigma_i d_i$ (ie., number of calendar days in Reference Quarter) |

In one implementation, the assignment of the futures contract at delivery may be accomplished using CME's enhanced Basis Trade at Index Close (BTIC+) functionality to enter into a futures contract whose settlement is based on a future computed value, i.e., the final interest rate determined at the end of the reference period.

Generally, basis Trade at Index Close (BTIC) and BTIC+ transactions enable market participants to execute a basis trade relative to the official close for the underlying index. Furthermore, BTIC+on, for example, E-mini S&P 500 now allows customers to execute this trade days in advance of the closing index print.

A BTIC transaction is entered into via a basis expressed in discrete index points, where the executed trade price is the total number of index points to be applied to the official close price of the underlying index. In essence, a BTIC transaction provides the ability to trade the future at a price understood to be the theoretical equivalent of the official cash index close with given assumptions on dividends and all-in implied financing to maturity. Since the BTIC market is expressed in terms of the futures price differential to the spot index value, also known as "the basis," the indicated market prices can be either negative or positive depending on expected dividends, financing and time to maturity. The BTIC price will be transposed to a futures contract price forty-five (45) minutes following the close of the underlying cash equity market, where the futures position will be assigned a price equal to the official closing index value plus the basis.

BTIC bid, ask and trade prices must be in valid tick increments as per the corresponding BTIC contract specifications. However, the futures contract trade price resulting from the basis applied to the cash index close price does not need to be in the contract specified tick increment and will not be rounded to the nearest tick.

With respect to BTIC+, historically, customers could only trade BTIC on a "T" basis. Meaning, customers could only trade the BTIC instrument associated with the trading session immediately preceding the nearest closing index auction. With the introduction of BTIC+, customers can execute a BTIC trade for a given trading session in advance. This marks the beginning of "T+" trading. While BTIC contracts deliver into outright index futures contracts on the same day trading session, BTIC+ are futures contracts that allow market participants to execute a basis trade on, for example, E-mini S&P 500 futures relative to the official closing, or opening, S&P 500 cash index level for a given trading session, days in advance. For example, suppose Participant A and Participant B trade the BTIC+on trade date August 6 for the BTIC instrument that will ultimately deliver into E-mini S&P futures on August 9. Each day the position would be marked to market; the position will incur final mark-to-market after the close on August 8 before being delivered into an EST contract on the morning of August 9. EST is then delivered into a futures position after the August 9 closing S&P 500 value is published.

The disclosed embodiments reduce the number of transactions necessary to create the risk hedging position from two to one, reducing the computational resources necessary to create, execute, store and manage the transactions as well as eliminate "leg" risk where changes in market conditions between when the first position is created and the second position is created may undermine the overall position. Furthermore, as the central counterparty manages risk of non-performance by any one counterparty with respect to the other, the need for a pre-arranged credit relationship or other exchange of pre-trade information by the counterparties is eliminated, thereby eliminating any risk of an information advantage of one party over another. In addition, utilizing dynamically generated physical settlement into a cash settled futures contract may ensure that risk prices are maintained while avoiding scarcity of the deliverables at time of delivery.

The disclosed embodiments may further operate automatically, e.g., upon expiration of spread contract such as an SCBSF contract, to identify a suitable outright futures contract, e.g., a futures contract calling for delivery of the within the same reference period as the spread contract. Once identified, the disclosed embodiments may automatically compute the price of outright futures contract positions required to equate the spread risk at settlement of the expiring spready contract. In one embodiment, the system may maintain, or be coupled with, a database of active spread contracts which are periodically evaluated to determine the expiration thereof.

The disclosed technology addresses the need in the art for enabling creation of a spread position as between forward and backward interest rate benchmarks where the backward rate is unknown at the time the forward rate is established, by using physical delivery of a later settling outright futures position. Furthermore, the disclosed embodiments, by delivering a set of bifurcated positions in the outright later settling futures contract, enable previously unavailable capabilities of each party to dispose of their position without affecting the other party's position, or otherwise, utilize their position for other purposes, such as to offset another position or net against a margin requirement of another position.

The disclosed embodiments may automate the process of transforming the physical delivery requirement of an expiring or expired basis spread contract into the requisite futures positions and subsequently enabling the trading thereof. Specifically, the disclosed technology solves a problem that uniquely arises in the fields of computer technology and exchange computer systems which must manage physical delivery of assets, where physical delivery requirements are necessarily handled outside of the electronic transaction processing systems which process the transactions therefore. By automatically utilizing a physical delivery requirement using futures contract positions, the exchange computer system may enable new functionality which, for example, allows those positions to be disposed of so as to avoid the physical delivery requirement. Furthermore, the disclosed embodiments enable an electronic trading system to utilize its existing settlement systems, avoiding having to transmit transactions to the external settlement systems of third-parties, e.g. CLS®, Marketwire™ or LCH™. By avoiding transmission to external systems, transactions may be processed faster and consumption of network communications bandwidth is reduced.

The disclosed embodiments are drawn to systems and methods that include specific computing components, each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computer system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined by equations. Products, e.g., financial instruments, or order books representing the state of an electronic marketplace for a product, may be represented as data objects within the exchange computer system. The instructions may also be conditional, e.g., buy or sell a quantity of a product at a given value if a trade for the product is executed at some other reference value. The data transaction processing system may include various specifically configured conversion processors that convert, e.g., automatically, data objects representative of bilateral contracts, which have or will expire, and convert those data objects into two more new data objects indicative of futures positions which substantially replicate the characteristics of the original data object.

The application may be executed by one or more of the assignment processors/modules. Thus, the application may be an assignment module, such as the conversion module illustrated in FIG. 3 described in more detail below.

Exchange Computer System

An exchange provides one or more markets for the purchase and sale of various types of products including financial instruments such as stocks, bonds, futures contracts, options, currency, cash, swaps and other similar instruments. Agricultural products and commodities are also examples of products traded on such exchanges. As was described above, a futures contract is a product that is a contract for the future delivery of a financial instrument such as a quantity of grains, metals, oils, bonds, currency, or cash settled against a rate. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. For some types of products (e.g., variable commodities), the specification may further define variables, step sizes, premiums, or discounts for use in processing orders. The exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers or may be characterized by more aggressive actions so as to maintain risk and/or exposure as a speculative investment strategy. From an alternate perspective, a market maker may be considered a market participant who places an order to sell at a price at which there is no previously or concurrently provided counter order. A market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and may also feature high volumes of executed transactions indicating that large quantity orders may be executed without driving prices significantly higher or lower.

As was described above, a financial instrument trading system, such as a futures exchange, such as the Chicago Mercantile Exchange Inc. (CME), provides a contract market where financial instruments, e.g., futures and options on futures, are traded using electronic systems and may operate under a central counterparty model, where the exchange acts as an intermediary between market participants for the transaction of financial instruments.

Electronic messages such as incoming messages from market participants, i.e., "outright" messages, e.g., trade order messages, etc., are sent from client devices associated with market participants, or their representatives, to an electronic trading or market system.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell various quantities of that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade therebetween to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of an instrument at a price, and the other order includes instructions for or specifies selling a (different or same) quantity of the instrument at a same or better price. It should be appreciated that performing an instruction associated with a message may include attempting to perform the instruction. Whether or not an exchange computer system is able to successfully perform an instruction may depend on the state of the electronic marketplace.

While the disclosed embodiments will be described with respect to a product by product or market by market implementation, e.g., implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, swap, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access, and participant expectations with respect thereto. In addition, it may be appreciated that electronic trading systems further impose additional expectations and demands by market participants as to transaction processing speed, latency, capacity, and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems offer an efficient, fair and balanced market where market prices reflect a true consensus of the value of products traded among the market participants. Electronic marketplaces use electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e., counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

As was described above, the exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computer system may receive conditional orders or messages for a data object, where the order may include two prices or values: a reference value and a stop value. A conditional order may be configured so that when a product represented by the data object trades at the reference price, the stop order is activated at the stop value. For example, if the exchange computer system's order management module (described below) includes a stop order with a stop price of 5 and a limit price of 1 for a product, and a trade at 5 (i.e., the stop price of the stop order) occurs, then the exchange computer system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all the identified orders have been considered or all the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computer system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming order, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house also manages the delivery process.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants relatively quickly. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles, and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Clearing houses, like the CME clearing house, may specify the conditions of delivery for the contracts they cover. The exchange designates warehouse and delivery locations for many commodities. When delivery takes place, a warrant or bearer receipt that represents a certain quantity and quality of a commodity in a specific location changes hands from the seller to the buyer who then makes full payment. The buyer has the right to remove the commodity from the warehouse or has the option of leaving the commodity at the storage facility for a periodic fee. The buyer could also arrange with the warehouse to transport the commodity to another location of his or her choice, including his or her home, and pays any transportation fees. In addition to delivery specifications stipulated by the exchanges, the quality, grade, or nature of the underlying asset to be delivered are also regulated by the exchanges.

The delivery process may involve several deadlines that are handled by the exchange clearing house. Different commodities may include different parameters and timing for delivery. The first deadline of an example delivery process is called position day. This is the day that the short position holder in the market indicates to the exchange clearing house that the holder intends to make delivery on his futures position and registers a shipping certificate in the clearing delivery system. Also, starting on the first position day, each participant reports all of its open long positions to the clearing house. The clearing house ranks the long positions according to the amount of time they have been open and assigns the oldest long position to the short position holder that has given his intention to deliver.

At a second deadline, referred to as notice day, the short position holder and long position holder receive notification that they have been matched, and the long position holder receives an invoice from the clearing house. A third deadline is the actual delivery day. The long position holder makes payment to the clearing house, and the clearing house simultaneously transfers the payment from the long to the short position holder, and the shipping certificate is transferred from the short to the long position holder. Now the long position holder is the owner of the shipping certificate and the participant has several options. In an example of grain, the participant can hold the certificate indefinitely, but must pay the warehouse that issued the certificate storage charges, that are collected and distributed monthly by the clearing house. The participant can cancel the shipping certificate and order the issuing warehouse to load-out the physical commodity into a conveyance that he places at the issuing warehouse. The participant can transfer or sell the certificate to someone else. Or the participant can go back into the futures market and open a new position by selling futures, in which case he now becomes the short position holder. The participant may then initiate a new three-day delivery process, that would entail re-delivery of the warehouse certificate the participant now owns. During this time, the participant will continue to pay storage charges to the warehouse until he re-delivers the certificate.

Computing Environment

The embodiments may be described in terms of a distributed computing system. The examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 120, 152, 154, 156 and 158, as described herein, coupled with the exchange computer system 100. Wherein the exchanges computer system 100 implements clearing functions, as described herein, it may also be referred to as a central counterparty computing system 100.

Herein, the phrase "coupled with" is defined to mean directly connected to or indirectly connected through one or more intermediate components. Such intermediate components may include both hardware- and software-based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions hereinbefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
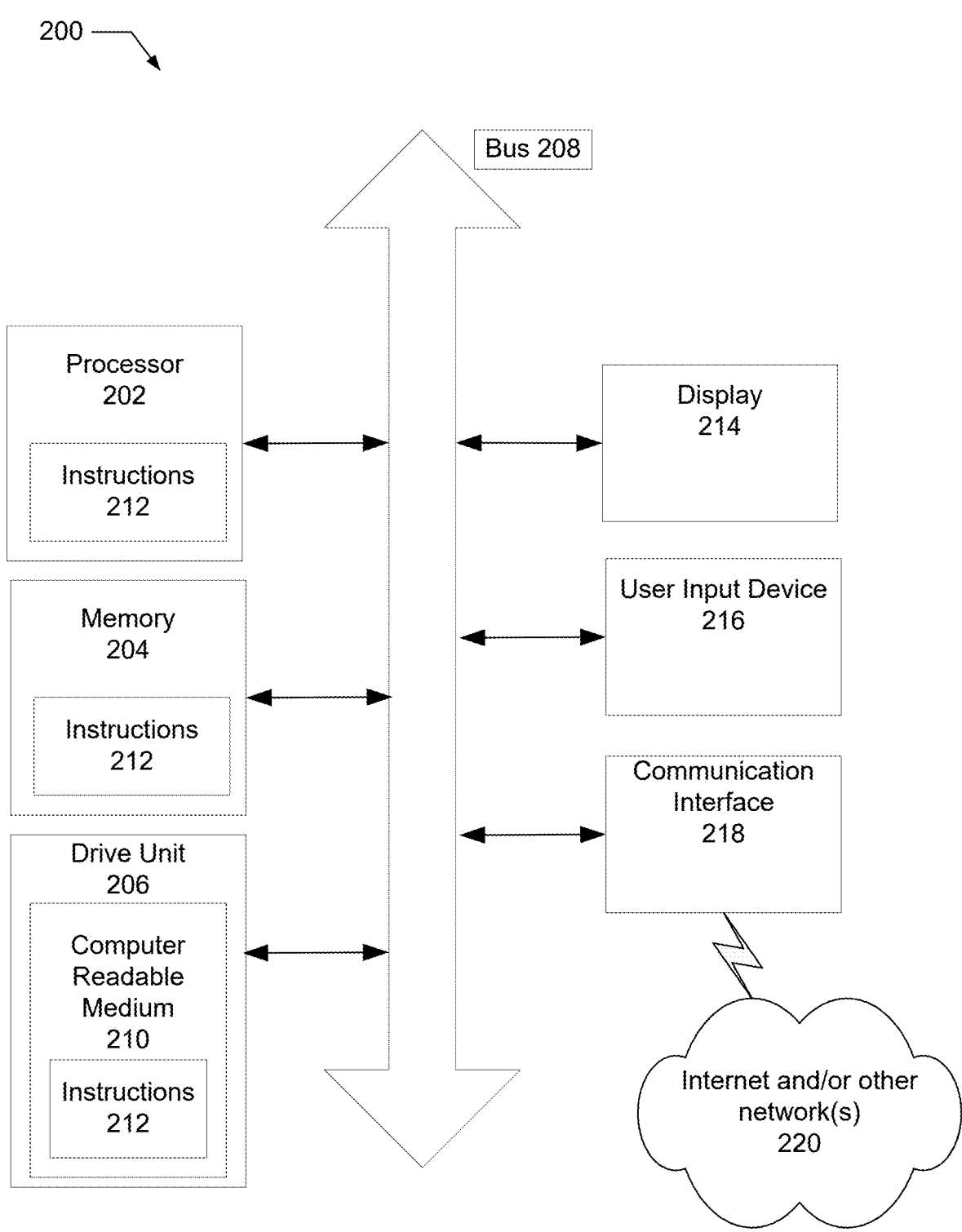
FIG. 2 depicts a general computer system, according to some embodiments.

The exchange computer system 100 may be implemented with one or more mainframes, desktops, or other computers, such as the example computer 200 described herein with respect to FIG. 2. A user database 102 may be provided which includes information identifying traders and other users of exchange computer system 100, such as account numbers or identifiers, usernames, and passwords. An account data module 104 may be provided which may process account information that may be used during trades. The account data module 104 may store relationship information for the participants of the exchange. For example, the account data module 104 may store credit relationship data that defines credit relationships between participants. The account data module 104 may store data that defines which participants other participants are willing to trade with or otherwise complete contracts. Certain participants, for example, may wish to avoid trading with a competitor or otherwise unwelcome trading partner. Certain participants may be denied the opportunity to trade with other participants due to regulatory actions or legal reasons. A portfolio database 124 may be maintained by the account data module 104, as or part of separate from, the user database 102, and which is further coupled with the settlement module 120, described below. The portfolio database 124 stores one or more data records in association with each trader, or trading entity, which contain data indicative of current/open positions held by the trader or trading entity, such as positions in one or more futures contracts, or options thereon, which have not yet reached their maturity or have otherwise been offset or otherwise closed out. Each data record may store data indicative of the details of the position held by the trader/trading entity, such as side, quantity, settlement price, settlement date, etc. The portfolio database 124 may include, or be coupled with, logic or other functionality which may periodically evaluate the positions held by a trader/trading entity represented by the stored data to recognize one or more positions which offset one another and wherein positions which are completely offset may be removed from the database to reduce the data storage requirements thereof. Such functionality may be referred to as compression or portfolio compression and may be implemented by the settlement module 120 or the risk management module 114 as part of the analysis of the portfolio for margin determination.

A match engine module 106 may be included to match bid and offer prices and may be implemented with software that executes one or more algorithms for matching bids and offers. A trade database 108 may be included to store information identifying trades and descriptions of trades. Trade database 108 may store information identifying the time that a trade took place and the contract price. The positions created for each counterparty to a completed trade may then be stored as data records in the portfolio database 124 in association with the respective trader/trading entity, i.e. in the trader/trading entity's portfolio.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant associated therewith in the portfolio database 124. The risk management module 114 may be configured to administer, manage, or maintain one or more margining mechanisms implemented by the exchange computer system 100. Such administration, management or maintenance may include managing database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in each message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled order that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 (or order processor 118) may be included to decompose delta-based, spread instrument, bulk, and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 116, or as an independent functioning module. The order processing module 136 may be configured to perform one or more market integrity checks for incoming transactions.

In an embodiment, the order processing module 118 may include one or more market integrity processors that implement market integrity mechanisms such as credit limits, credit banding, velocity logic, or circuit breakers as described below.

As an intermediary to electronic trading transactions, the exchange bears a certain amount of risk in each transaction that takes place. To that end, the clearing house implements processes by which trades are confirmed, matched and settled, as well as risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to clearing, settling, e.g. regulating delivery and payment therefore, or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

Clearing functions implemented by settlement module 120 may be provided, not only for exchange traded instruments, such as futures and options thereon, but also for centrally cleared bilateral transactions. Centrally cleared bilateral transactions are transactions entered into bilaterally, i.e. directly between the parties or via a broker, where the parties have agreed to submit the transaction to a third-party clearing system to confirm the transaction details and complete the transaction, effect risk management over the life of the transaction, and settlement upon conclusion thereof.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

In one embodiment, where the clearing functions are provided independent of any exchange/trading functions, the settlement module 120 may be implemented by a central counterparty computing system separate from the exchange computer system 100.

In one embodiment, the exchange computer system 100 may further include an assignment module 122, which may be a separate module or part of the settlement module 120. As will be described below, the assignment module 122 may determine, e.g. automatically, when a bilateral transaction for physical delivery of an asset is expired, or will expire, and enter the settlement phase for processing thereof by the settlement processor 120 as described above. The assignment module 122 may act to defer the physical delivery obligation, and the corresponding payment therefore, by generating a financially equivalent futures contract positions for the transacting parties in the exchange computer system 120. In one embodiment, the assignment module 122 may operate with respect to centrally cleared bilateral transactions forwarded to the settlement module 120 for clearing. Alternatively, or in addition thereto, the assignment module 122 may be coupled with one or more OTC trading systems to process bilateral transactions traded via those systems as described herein.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits (where traders, or their representatives, all physically stand in a designated location, i.e., a trading pit, and trade with each other via oral and visual/hand based communication) and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange computer system 100 for financial instruments. It should be appreciated that the disclosed embodiments may be implemented as a different or separate module of the exchange computer system 100, or a separate computer system coupled with the exchange computer system 100 to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based computer device, or other wireless device, may communicate with the LAN 160 and/or the Internet 162 via radio waves, such as via Wi-Fi, Bluetooth® and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 150 may include computer-executable instructions for receiving market data from exchange computer system 100 and displaying that information to a user.

Numerous additional servers, computers, handheld devices, personal digital assistants, telephones, and other devices may also be connected to exchange computer system 100. Moreover, one skilled in the art will appreciate that the topology shown in FIG. 1 is merely an example and that the components shown in FIG. 1 may include other components not shown and may be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In an embodiment, the computer system 200 can be implemented using electronic devices that provide voice, video, or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random-access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disk, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid-state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control, or any other device operative to interact with the system 200.

In an embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In an embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images, or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMAX network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. While the computer-readable medium is shown to be a single medium, the term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

Although the present specification describes components and functions that may be implemented in some embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical discs, or optical discs. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical discs; and CD ROM and DVD-ROM discs. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel® Xeon® processor or an AMD Opteron™ processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (change-able) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back-end component, e.g., a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

Figure 3:
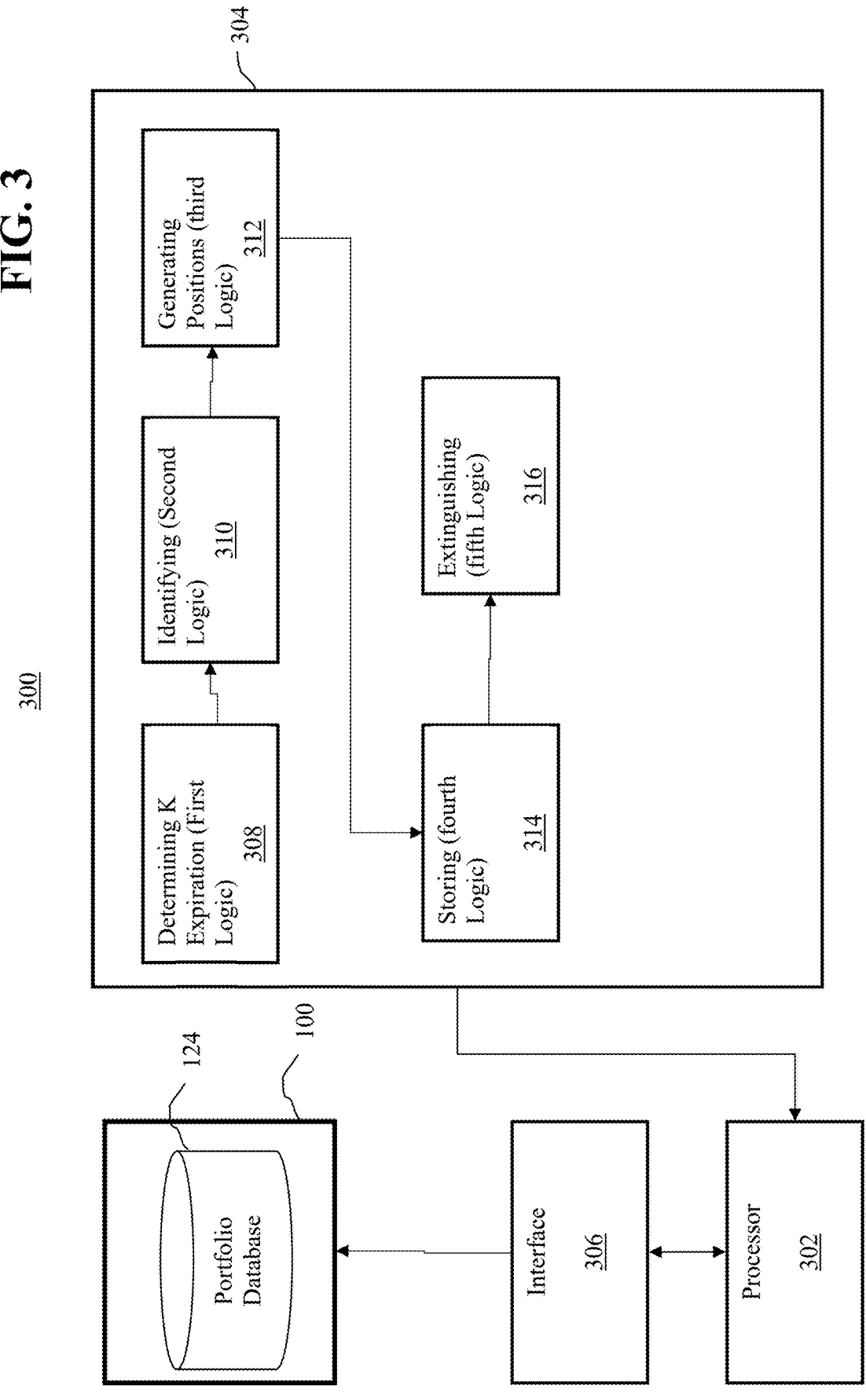
FIG. 3 depicts a block diagram of a system for automatically utilizing physical delivery of a dynamically generated position in an outright futures contract to satisfy a delivery requirement of a spread futures contract according to one embodiment.

FIG. 3 depicts a block diagram of a system 300 for automated enablement of using a physical delivery of a dynamically generated position in an outright futures contract to satisfy a delivery requirement of a spread futures contract to, upon expiration thereof, deliver at least one component whose value is unknown at a time of delivery. It will be appreciated that the system 300 may be a part of, or in communication with the Settlement Module 120, assignment module 122, or other module of the exchange computer system 100 described above and shown in FIG. 1, or part of, or in communication with, external settlement systems, such as CLS®, Marketwire™ or LCH™. Alternatively, the system 300 may be part of a central counterparty computer system separate from, but in electronic communication with, the exchange computer system 100. The system 300 includes a processor 302, and a non-transitory memory 304, such as the processor and memory which implement the exchange computer system, and transaction interface 306 coupled therewith, such as the processor 202, memory 204 and/or interfaces 214, 216, 218 described in detail above with reference to FIG. 2. In one embodiment, the transaction interface 306 is coupled with the portfolio database 124 or other database, internal or external to the exchange computer system 100, which stores data representative of basis spread contracts entered into by participants of the electronic trading system implemented by the exchange computer system 100. Alternatively, or in addition thereto, the transaction interface 306 receives messages communicated from an external management system, such as a clearing system, indicating that a requisite spread contract has or is about to expire.

The memory 304 being operative to store computer executable instructions, such as in the form of one or more logic components, e.g. first through fifth logic components 308-316, that when executed by the processor 302, cause the processor 302 to: determine, via transmission of an electronic transaction to an external clearing system 120 (100), that a data record stored in a database 124 coupled with the processor 302, which stores data indicative of the spread futures contract, indicates that the spread futures contract, in which a first participant holds a first position and a second participant holds a second position opposite the first position, has expired, the expired spread futures contract being characterized at expiration by a settlement value based on a current value of at least one component whose value is known at expiration and a prior value of the spread futures contract; identify, automatically based on the determination that the spread futures contract has expired, an outright futures contract, having an underlier corresponding to the at least one component whose value is unknown at expiration, currently traded on an electronic trading system, implemented by the exchange computer system 100, which calls for a future delivery of an asset corresponding to the at least one component whose value is unknown at expiration; generate a first position in the identified outright futures contract for the first participant and a second position in the identified outright futures contract opposite to the first position for the second participant, each of the first and second positions being defined at a price equal to the settlement value which characterizes the expired spread futures contract, the first and second positions being independent of each other; store the first position in a first data record associated with the first participant and the second positions in a second data record associated with the second participant, the first and second data records being stored in a portfolio database 124 of the electronic trading system coupled with the exchange computer system 100 and enabling trading thereof; and extinguish the delivery requirement of the spread futures contract; and wherein either the first position and/or the second position is disposable without affecting the other of the first or second positions, such that the first or second participant is enabled to obtain the delivery of the asset corresponding to the second component independent of the first participant.

Alternatively, the above computer executable instructions or logic components 308-316 may be implemented as one or more separate components, such as on an FPGA which may include a memory or reconfigurable component to store logic and a processing component to execute the stored logic.

In one embodiment, the value of the at least one component whose value is unknown at expiration, is determined at a date subsequent thereto, the identifying further comprising identifying the outright futures contact having an expiration that is the same as date on which the value of the at least one component, whose value is unknown at expiration, is determined.

In one embodiment, the at least one component whose value is unknown and the at least one component whose value is known are defined by a reference period of time, a value of the at least one component whose value is known being determinable at a beginning of the reference period of time and a value of the at least one component whose value is unknown being determinable at an end of the reference period of time.

In one embodiment, the current value of the at least one component whose value is known is determined from a data source external to and coupled with the exchange computer system, e.g., the Euribor benchmark interest rate.

In one embodiment, the spread futures contract is characterized by a spread between the at least one component whose value is known at expiration and the at least one component whose value is unknown at expiration.

In one embodiment, the outright futures contract is characterized by a settlement date, e.g., 3 months, subsequent to the time of delivery and a settlement price computed at the settlement date.

In one embodiment, the prior value of the spread futures contract comprises a most recent prior settlement price thereof.

In one embodiment, the spread futures contract specifies the outright futures contract.

In one embodiment, the outright futures contract comprises one of a European Short Term Interest Rate futures contract or a RepoFunds Rate futures contract.

In one embodiment, the future delivery of the outright futures contract comprises a cash settlement.

The system of claim 15, wherein the electronic trading system does not reveal the identities of the first and second participants to each other.

In one embodiment, the second position may be sold without affecting the first position.

In one embodiment, the second position may be offset by a third position held by the second participant in the portfolio database opposite the second position without affecting the first position.

In one embodiment, the second position may be netted with a third position held by the second participant in the portfolio database opposite the second position to determine a risk of loss of the second participant.

As was noted above, the first and second positions, i.e. the position in the futures contracts created for the short/seller and the position in the futures contracts created for the long/buyer, being positions in standardized exchange traded and centrally cleared instruments allows either the first position and/or the second position to be disposed of without affecting the other of the first or second positions. For example, the second position may be sold without affecting the first position, and vice versa, either position may be offset by another position held by the respective participant without affecting the position held by the other participant, and/or the first or second position may be netted with a third position held by the respective participant in the portfolio database opposite (or complimentary) thereto to determine a risk of loss of the respective participant.

Figure 4:
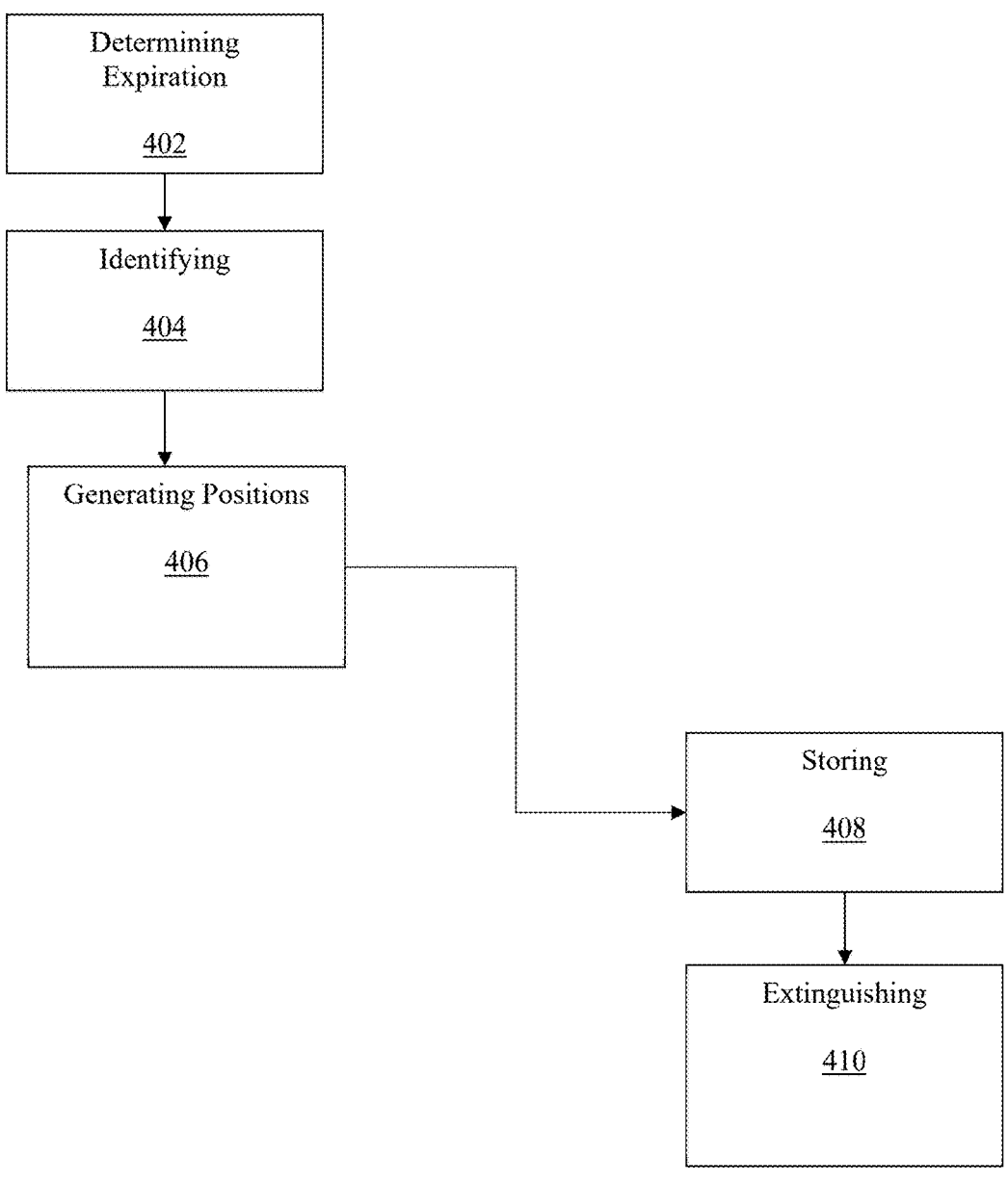
FIG. 4 depicts a flow chart showing the operation of the system of FIG. 3 according to one embodiment.
Figure 6:
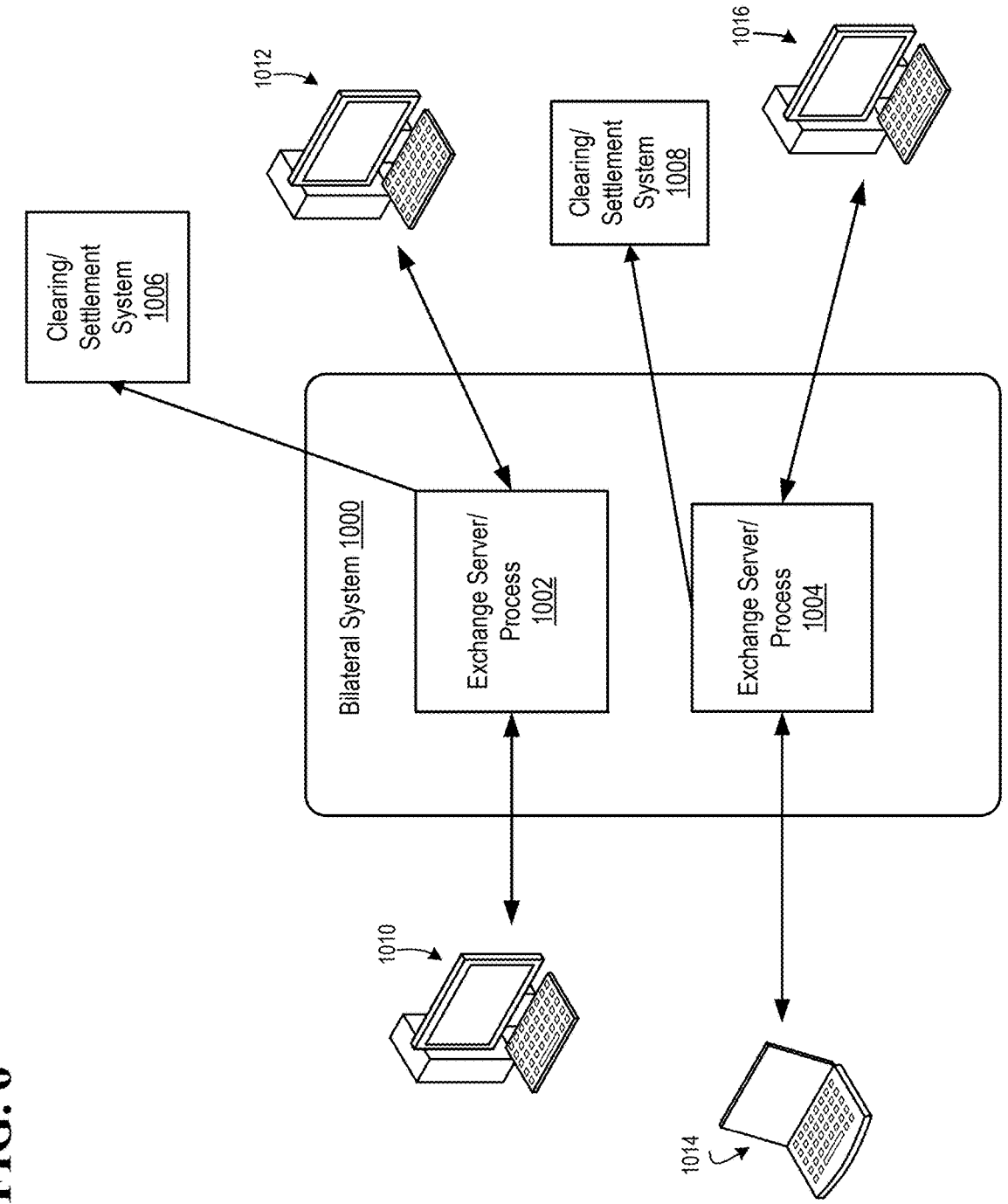
FIG. 6 depicts a block diagram of a bilateral system according to some embodiments.

FIG. 4 depicts a flow chart showing operation of the system 300 of FIGS. 1-3. In particular FIG. 4 shows a method, which may be computer implemented, for automatically using a physical delivery of a dynamically generated position in an outright futures contract to satisfy a delivery requirement of a spread futures contract to, upon expiration thereof, deliver at least one component whose value is unknown at a time of delivery.

In one embodiment, the operation of the system 300 includes: determining, by a processor 302 of an exchange computer system 100 via transmission of an electronic transaction to an external clearing system, that a data record stored in a database 124 coupled with the processor 302, which stores data indicative of the spread futures contract, indicates that the spread futures contract, in which a first participant holds a first position and a second participant holds a second position opposite the first position, has expired, the expired spread futures contract being characterized at expiration by a settlement value based on a current value of at least one component whose value is known at expiration and a prior value of the spread futures contract (Block 402); identifying, automatically by the processor 302 based on the determination that the spread futures contract has expired, an outright futures contract, having an underlier corresponding to the at least one component whose value is unknown at expiration, currently traded on an electronic trading system, implemented by the exchange computer system 100, which calls for a future delivery of an asset corresponding to the at least one component whose value is unknown at expiration (Block 404); generating, by the processor 302, a first position in the identified outright futures contract for the first participant and a second position in the identified outright futures contract opposite to the first position for the second participant, each of the first and second positions being defined at a price equal to the settlement value which characterizes the expired spread futures contract, the first and second positions being independent of each other (Block 406); storing, by the processor 302, the first position in a first data record associated with the first participant and the second positions in a second data record associated with the second participant, the first and second data records being stored in a portfolio database 124 of the electronic trading system coupled with the exchange computer system 100 and enabling trading thereof (Block 408); and extinguishing, by the processor 302, the delivery requirement of the spread futures contract (Block 410); and wherein either the first position and/or the second position is disposable without affecting the other of the first or second positions, such that the first or second participant is enabled to obtain the delivery of the asset corresponding to the second component independent of the first participant.

In one embodiment, the value of the at least one component whose value is unknown at expiration, is determined at a date subsequent thereto, the identifying further comprising identifying the outright futures contact having an expiration that is the same as date on which the value of the at least one component, whose value is unknown at expiration, is determined.

In one embodiment, the at least one component whose value is unknown and the at least one component whose value is known are defined by a reference period of time, a value of the at least one component whose value is known being determinable at a beginning of the reference period of time and a value of the at least one component whose value is unknown being determinable at an end of the reference period of time.

In one embodiment, the current value of the at least one component whose value is known is determined from a data source external to and coupled with the exchange computer system, e.g., the Euribor benchmark interest rate.

In one embodiment, the spread futures contract is characterized by a spread between the at least one component whose value is known at expiration and the at least one component whose value is unknown at expiration.

In one embodiment, the outright futures contract is characterized by a settlement date, e.g., 3 months, subsequent to the time of delivery and a settlement price computed at the settlement date.

In one embodiment, the prior value of the spread futures contract comprises a most recent prior settlement price thereof.

In one embodiment, the spread futures contract specifies the outright futures contract.

In one embodiment, the outright futures contract comprises one of a European Short Term Interest Rate futures contract or a RepoFunds Rate futures contract.

In one embodiment, the future delivery of the outright futures contract comprises a cash settlement.

In one embodiment, the electronic trading system does not reveal the identities of the first and second participants to each other.

In one embodiment, the second position may be sold without affecting the first position.

In one embodiment, the second position may be offset by a third position held by the second participant in the portfolio database opposite the second position without affecting the first position.

In one embodiment, the second position may be netted with a third position held by the second participant in the portfolio database opposite the second position to determine a risk of loss of the second participant.

It will be appreciated that the first and second data records indicative of the first and second positions may be directly generated and stored directly in the portfolio database 124. Alternatively, the system 300 may generate two or more synthetic trade orders and communicate the generated synthetic trade orders to the electronic trading system of the exchange computer system 100 which, when received by the electronic trading system of the exchange computer system 100 are matched by the match engine module 106 and settled via the settlement module 120, resulting in the first and second positions being created and stored in the portfolio database 124 as described.

As was noted above, the first and second positions being positions in standardized exchange traded and centrally cleared instruments allows either the first position and/or the second position to be disposed of without affecting the other of the first or second positions. For example, the second position may be sold without affecting the first position, and vice versa, either position may be offset by another position held by the respective participant without affecting the position held by the other participant, and/or the first or second position may be netted with a third position held by the respective participant in the portfolio database opposite (or complimentary) thereto to determine a risk of loss of the respective participant.

CONCLUSION

The illustrations of the embodiments described herein are intended to provide a general understanding of the structure of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure.

Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for automatically using a physical delivery of a dynamically generated position in an outright futures contract to satisfy a delivery requirement of a spread futures contract, having at least two components, to, upon expiration thereof, deliver at least one component whose value is unknown at expiration of the spread futures contract, the method comprising:

determining, by a processor of an exchange computer system via transmission of an electronic transaction to an external clearing system, that a data record stored in a database coupled with the processor, which stores data indicative of the spread futures contract, indicates that the spread futures contract, in which a first participant holds a first position and a second participant holds a second position opposite the first position, has expired, the expired spread futures contract being characterized at expiration by a settlement value based on a current value of at least one component, different from the at least one component whose value is unknown, whose value is known at expiration and a prior value of the spread futures contract;

identifying, automatically by the processor based on the determination that the spread futures contract has expired, an outright futures contract, having an underlier corresponding to the at least one component whose value is unknown at expiration, currently traded on an electronic trading system, implemented by the exchange computer system, which calls for a future delivery of an asset corresponding to the at least one component whose value is unknown at expiration;

generating, by the processor, a first position in the identified outright futures contract for the first participant and a second position in the identified outright futures contract opposite to the first position for the second participant, each of the first and second positions being defined at a price equal to the settlement value which characterizes the expired spread futures contract, the first and second positions being independent of each other;

determining, by the processor, that the second position in the identified outright futures contract offsets a third position in the identified outright futures contract currently held by the second participant and stored in a data record associated with the second participant stored in portfolio database of the electronic trading system coupled with the exchange computer system;

storing, by the processor, the first position in a first data record associated with the first participant in the portfolio database and enabling trading thereof and based on the determination that the second position in the identified outright futures contract offsets the third position in the identified outright futures contract, not storing the second position in the portfolio database and removing the data record in which the third position is stored from the portfolio database, a data size of the portfolio database being reduced thereby; and extinguishing, by the processor, the delivery requirement of the spread futures contract; and wherein the disposition of the second position does not affect the first position such that the first participant is enabled to obtain the delivery of the asset corresponding to the at least one component whose value is unknown at expiration independent of the second participant.

2. The computer implemented method of claim 1, wherein the value of the at least one component whose value is unknown at expiration, is determined at a date subsequent thereto, the identifying further comprising identifying the outright futures contract having an expiration that is the same as the date on which the value of the at least one component, whose value is unknown at expiration, is determined.

3. The computer implemented method of claim 1, wherein the at least one component whose value is unknown and the at least one component whose value is known are defined by a reference period of time, a value of the at least one component whose value is known being determinable at a beginning of the reference period of time and a value of the at least one component whose value is unknown being determinable at an end of the reference period of time.

4. The computer implemented method of claim 1, wherein the current value of the at least one component whose value is known is determined from a data source external to and coupled with the exchange computer system.

5. The computer implemented method of claim 1, wherein the spread futures contract is characterized by a spread between the at least one component whose value is known at expiration and the at least one component whose value is unknown at expiration.

6. The computer implemented method of claim 1, wherein the outright futures contract is characterized by a settlement date subsequent to the time of delivery and a settlement price computed at the settlement date.

7. The computer implemented method of claim 1, wherein the prior value of the spread futures contract comprises a most recent prior settlement price thereof.

8. The computer implemented method of claim 1, wherein the spread futures contract specifies the outright futures contract.

9. The computer implemented method of claim 1, wherein the outright futures contract comprises one of a European Short Term Interest Rate futures contract or a RepoFunds Rate futures contract.

10. The computer implemented method of claim 1, wherein the future delivery of the outright futures contract comprises a cash settlement.

11. The computer implemented method of claim 1, wherein the electronic trading system does not reveal the identities of the first and second participants to each other.

12. A system for automatically using a physical delivery of a dynamically generated position in an outright futures contract to satisfy a delivery requirement of a spread futures contract, having at least two components, to, upon expiration thereof, deliver at least one component whose value is unknown at expiration of the spread futures contract, the system comprising:

first logic stored in a memory and executable by a processor of an exchange computer system coupled with the memory to cause the processor to determine, via transmission of an electronic transaction to an external clearing system, that a data record stored in a database coupled with the processor, which stores data indicative of the spread futures contract, indicates that the spread futures contract, in which a first participant holds a first position and a second participant holds a second position opposite the first position, has expired, the expired spread futures contract being characterized at expiration by a settlement value based on a current value of at least one component, different from the at least one component whose value is unknown, whose value is known at expiration and a prior value of the spread futures contract;

second logic stored in the memory and executable by the processor to cause the processor to identify, automatically based on the determination that the spread futures contract has expired, an outright futures contract, having an underlier corresponding to the at least one component whose value is unknown at expiration, currently traded on an electronic trading system, implemented by the exchange computer system, which calls for a future delivery of an asset corresponding to the at least one component whose value is unknown at expiration;

third logic stored in the memory and executable by the processor to cause the processor to generate a first position in the identified outright futures contract for the first participant and a second position in the identified outright futures contract opposite to the first position for the second participant, each of the first and second positions being defined at a price equal to the settlement value which characterizes the expired spread futures contract, the first and second positions being independent of each other;

fourth logic stored in the memory and executable by the processor to cause the processor to determine that the second position in the identified outright futures contract offsets a third position in the identified outright futures contract currently held by the second participant and stored in a data record associated with the second participant stored in portfolio database of the electronic trading system coupled with the exchange computer system and store the first position in a first data record associated with the first participant in the portfolio database of the electronic trading system coupled with the exchange computer system and enabling trading thereof and based on the determination that the second position in the identified outright futures contract offsets the third position in the identified outright futures contract, not store the second position in the portfolio database and remove the data record in which the third position is stored from the portfolio database, a data size of the portfolio database being reduced thereby; and fifth logic stored in the memory and executable by the processor to cause the processor to extinguish the delivery requirement of the spread futures contract; and wherein the disposition of the second position does not affect the first position such that the first participant is enabled to obtain the delivery of the asset corresponding to the at least one component whose value is unknown at expiration independent of the second participant.

13. The system of claim 12, wherein the value of the at least one component whose value is unknown at expiration, is determined at a date subsequent thereto, the identifying further comprising identifying the outright futures contract having an expiration that is the same as date on which the value of the at least one component, whose value is unknown at expiration, is determined.

14. The system of claim 12, wherein the at least one component whose value is unknown and the at least one component whose value is known are defined by a reference period of time, a value of the at least one component whose value is known being determinable at a beginning of the reference period of time and a value of the at least one component whose value is unknown being determinable at an end of the reference period of time.

15. The system of claim 12, wherein the current value of the at least one component whose value is known is determined from a data source external to and coupled with the exchange computer system.

16. The system of claim 12, wherein the spread futures contract is characterized by a spread between the at least one component whose value is known at expiration and the at least one component whose value is unknown at expiration.

17. The system of claim 12, wherein the outright futures contract is characterized by a settlement date subsequent to the time of delivery and a settlement price computed at the settlement date.

18. The system of claim 12, wherein the prior value of the spread futures contract comprises a most recent prior settlement price thereof.

19. The system of claim 12, wherein the spread futures contract specifies the outright futures contract.

20. The system of claim 12, wherein the outright futures contract comprises one of a European Short Term Interest Rate futures contract or a RepoFunds Rate futures contract.

21. The system of claim 12, wherein the future delivery of the outright futures contract comprises a cash settlement.

22. The system of claim 12, wherein the electronic trading system does not reveal the identities of the first and second participants to each other.

23. A system for automatically using a physical delivery of a dynamically generated position in an outright futures contract to satisfy a delivery requirement of a spread futures contract, having at least two components, to, upon expiration thereof, deliver at least one component whose value is unknown at expiration of the spread futures contract a time of delivery, the system comprising:

an exchange computer system including a processor and a memory coupled therewith, the memory storing computer executable program code which when executed by the processor, cause the processor to:

determine, via transmission of an electronic transaction to an external clearing system, that a data record stored in a database coupled with the processor, which stores data indicative of the spread futures contract, indicates that the spread futures contract, in which a first participant holds a first position and a second participant holds a second position opposite the first position, has expired, the expired spread futures contract being characterized at expiration by a settlement value based on a current value of at least one component, different from the at least one component whose value is unknown, whose value is known at expiration and a prior value of the spread futures contract;

identify, automatically based on the determination that the spread futures contract has expired, an outright futures contract, having an underlier corresponding to the at least one component whose value is unknown at expiration, currently traded on an electronic trading system, implemented by the exchange computer system, which calls for a future delivery of an asset corresponding to the at least one component whose value is unknown at expiration;

generate a first position in the identified outright futures contract for the first participant and a second position in the identified outright futures contract opposite to the first position for the second participant, each of the first and second positions being defined at a price equal to the settlement value which characterizes the expired spread futures contract, the first and second positions being independent of each other;

determine that the second position in the identified outright futures contract offsets a third position in the identified outright futures contract currently held by the second participant and stored in a data record associated with the second participant stored in portfolio database of the electronic trading system coupled with the exchange computer system;

store the first position in a first data record associated with the first participant in the portfolio database and enabling trading thereof and based on the determination that the second position in the identified outright futures contract offsets the third position in the identified outright futures contract, not storing the second position in the portfolio database and removing the data record in which the third position is stored from the portfolio database, a data size of the portfolio database being reduced thereby; and extinguish the delivery requirement of the spread futures contract; and wherein the disposition of the second position does not affect the first position such that the first participant is enabled to obtain the delivery of the asset corresponding to the at least one component whose value is unknown at expiration independent of the second participant.

* * * * *